(12) United States Patent
Nie

(10) Patent No.: US 7,349,389 B2
(45) Date of Patent: Mar. 25, 2008

(54) UNIT AND METHOD FOR DISTRIBUTING AND PROCESSING DATA PACKETS

(75) Inventor: Xiaoning Nie, München (DE)

(73) Assignee: Infineon Technologies AG, Munich (DE)

( * ) Notice: Subject to any disclaimer, the term of this patent is extended or adjusted under 35 U.S.C. 154(b) by 1075 days.

(21) Appl. No.: 10/444,860

(22) Filed: May 22, 2003

(65) Prior Publication Data

US 2003/0198239 A1    Oct. 23, 2003

Related U.S. Application Data

(63) Continuation of application No. PCT/DE01/04499, filed on Nov. 27, 2001.

(30) Foreign Application Priority Data

Nov. 28, 2000   (DE) .............................. 100 59 026

(51) Int. Cl.
*H04L 12/56* (2006.01)
(52) U.S. Cl. .................... 370/389; 709/102
(58) Field of Classification Search .................... None
See application file for complete search history.

(56) References Cited

U.S. PATENT DOCUMENTS

| | | | |
|---|---|---|---|
| 4,447,871 A | 5/1984 | Terada et al. | |
| 5,960,209 A * | 9/1999 | Blount et al. | ................... 712/1 |
| 5,978,831 A | 11/1999 | Ahamed et al. | |
| 6,058,267 A * | 5/2000 | Kanai et al. | ................... 712/28 |
| 6,175,567 B1 | 1/2001 | Yoo | |
| 6,363,453 B1 | 3/2002 | Esposito et al. | |
| 6,393,026 B1 * | 5/2002 | Irwin | ........................ 370/401 |
| 6,510,164 B1 * | 1/2003 | Ramaswamy et al. | ...... 370/466 |
| 6,735,219 B1 * | 5/2004 | Clauberg | .................... 370/474 |
| 6,804,815 B1 * | 10/2004 | Kerr et al. | ................... 718/100 |
| 6,842,443 B2 * | 1/2005 | Allen et al. | ................. 370/335 |
| 6,928,482 B1 * | 8/2005 | Ben Nun et al. | ........... 370/235 |
| 2002/0186656 A1 * | 12/2002 | Vu | .............................. 370/229 |
| 2006/0292292 A1 * | 12/2006 | Brightman et al. | ........... 427/66 |

FOREIGN PATENT DOCUMENTS

| | | |
|---|---|---|
| JP | 10 098 483 A | 4/1998 |
| WO | 00/30321 | 5/2000 |

OTHER PUBLICATIONS

Alteon Websystems: "Virtual matrix Architecture: Scaling Web Services for performance and Capacity", *White Paper*, Apr. 2000, pp. 1-12, XP-002191242.

* cited by examiner

*Primary Examiner*—Anh-Vu H. Ly
(74) *Attorney, Agent, or Firm*—Laurence A. Greenberg; Werner H. Stemer; Ralph E. Locher

(57) ABSTRACT

A unit for distributing and processing data packets has an administration unit for distributing the data packets to parallel-connected processor units. In this case, the processors of adjacent processor units have intermediate connections for interchanging data. The administration unit distributes the data packets in dependence on administration information for the data packets and/or on operating information for the processor units.

32 Claims, 1 Drawing Sheet

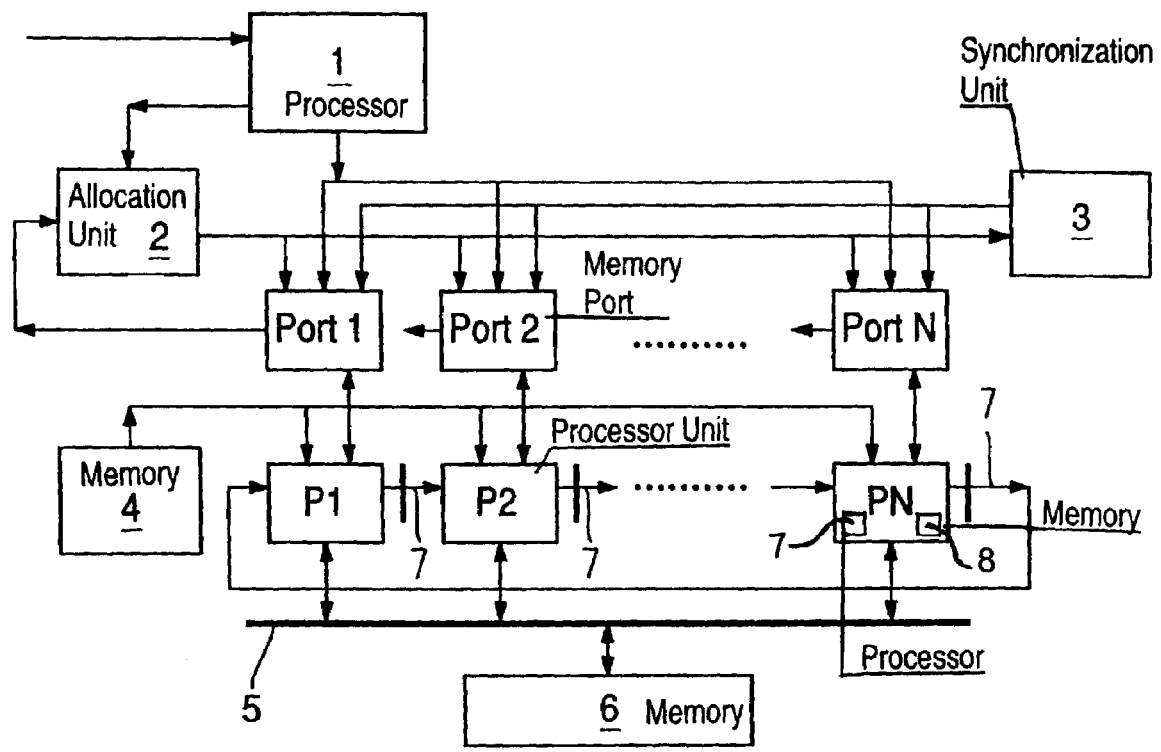

UNIT AND METHOD FOR DISTRIBUTING AND PROCESSING DATA PACKETS

CROSS-REFERENCE TO RELATED APPLICATION

This application is a continuation of copending International Application No. PCT/DE01/04499, filed Nov. 27, 2001, which designated the United States and was not published in English.

BACKGROUND OF THE INVENTION

Field of the Invention

The invention relates to a unit, which is formed from parallel-connected processors, for distributing and processing data packets.

Data rates of more than 1 Gb/s are currently achieved using glass fibers for transmitting the data packets. Transmission rates as high as this cannot yet be achieved in data networks owing to various limitations that result, for example, from data packet routers or distributors (switches). Conventional data packet routers are based primarily on software solutions. For some time, hardware solutions have also been in use, which frequently use semiconductor modules that were configured for specific applications. These so-called ASICs allow higher data transmission rates than pure software solutions, but offer far less flexibility. Furthermore, the processing speeds of the processors that are used for the actual data processing come nowhere near the data rates that can occur in data lines. For this reason, a change has been made to the use of two or more processors in parallel architectures, in which incoming data packets are distributed by data packet routers to the individual processors for processing. The parallel processing of the data packets allows flexible solutions to be implemented on a processor basis even when the data transmission rates are increased.

SUMMARY OF THE INVENTION

It is accordingly an object of the invention to provide a unit and a method for distributing and processing data packets which overcome the above-mentioned disadvantages of the prior art devices and methods of this general type, which is based on parallel-connected processors for distributing and processing data packets, and has a high data transmission rate. In particular, the unit to be provided is intended to be capable of being used for distributing and processing data packets for those routers for which an agreed quality of service (QoS) is intended to be guaranteed.

With the foregoing and other objects in view there is provided, in accordance with the invention, a unit for distributing and processing data packets. The unit contains a data bus and parallel-connected processor units for processing the data packets. The processor units have processors with each of the processor units having one processor and a connection to the data bus being a jointly used data bus. The processors of adjacent ones of the processor units have additional intermediate connections for interchanging data between the processor units. At least one administration unit is coupled to the processor units and distributes the data packets to the processor units in dependence on administration information stored in the data packets and/or on operating information of the processor units. The processor units transmit the operating information.

One major idea of the invention is for the unit for distributing and processing the data packets to have parallel-connected processor units, each having one processor. With each processor having not only a connection to a jointly used data bus but also additional intermediate connections to the processors of adjacent processor units. The additional intermediate connections are intended for interchanging data. Furthermore, the unit according to the invention contains at least one administration unit, whose task is to distribute the data packets to the processor units. This is done in dependence on administration information that is stored in the data packets and/or in dependence on operating information for the processor units, which is transmitted by the processor units.

One advantage of the unit according to the invention is that data can be passed to an adjacent processor unit, for example when one processor unit is overloaded. This measure allows a higher data transmission rate than is possible without this measure. A further advantageous feature is that the decision on the distribution of the data packets is made not only on the basis of the operating information for the processor units but also, in this case, by taking into account the administration information for the data packets. The administration information is generally stored in the headers of the data packets. Taking account of the administration information makes it possible to comply with an agreed QoS.

One preferred refinement of the invention provides for each processor unit to have an upstream input memory. The data packets which are assigned to the processor units by the at least one administration unit can be stored there temporarily, before they are processed by the processors.

The operating information for a processor unit may contain not only information about the load level on the associated processor and about the data which is located in the processor unit, but also about the filling level of the upstream input memory. This is essential information, which the at least one administration unit requires in order to distribute the data packets as well as possible to the processor units.

One particularly preferred refinement of the invention is characterized in that the at least one administration unit has an initial processor unit for reading the administration information which is stored in the data packets, an allocation unit for distributing the data packets to the processor units, and a synchronization unit for controlling the output times of the data from the processor units. The synchronization unit receives from the allocation unit the administration and operating information that is required for controlling the output times. The synchronization unit makes it possible to ensure that the data packets are output in a desired sequence from the processor units. By way of example, this is the sequence in which the data packets arrive at the unit according to the invention. Particularly in the case of a data stream that is formed from associated data packets, the sequence of the data packets is therefore not changed by the unit according to the invention. This may be one criterion for an agreed QoS. In order to satisfy a QoS such as this, the at least one administration unit may preferably be configured such that associated data packets are allocated to only one specific processor unit, or are distributed to a small number of specific processor units. This guarantees the successive processing and outputting of successive data packets.

A further refinement of the invention, which is particularly advantageous for the purpose of the agreed QoS, provides for the synchronization unit to transmit commands in the form of synchronization data cells to the input memories of the processor units, for controlling the output times of the data. In this case, the synchronization data cells are processed by the input memories and by the processor units with priority over other data.

Each processor unit preferably has a local data memory. The local data memory may be used for storing parts of a data packet while the rest of the data packet is being processed. In addition, it is advantageous for the processors to have access to at least one program memory, in which the programs that are required for processing the data are stored. Furthermore, it is advantageous for the unit according to the invention to have a memory area that is used jointly by all the processors. Classification tables and system-related data packets, for example, may be temporarily stored in the common memory area. The processors have access via the jointly used data bus to the common memory area.

According to a further advantageous refinement of the invention, the processor units transmit their operating information to the respectively adjacent processor units via the additional intermediate connections. If it is intended to interchange useful data between adjacent processor units, then this is preferably done as a function of the operating information. This ensures, for example, that when an overload occurs, a processor unit does not immediately transfer data to an adjacent processor unit that is likewise overloaded, but, if necessary, does not do this until the load on the adjacent processor unit has been reduced.

With the foregoing and other objects in view there is further provided, in accordance with the invention, a method for distributing data packets to parallel-connected processor units each having a processor, and for processing the data packets by the processors. The method includes reading administration information stored in the data packets, distributing the data packets to the processor units in dependence on the administration information of the data packets and/or operating information of the processor units, interchanging of data between processors of adjacent processor units in dependence on the operating information for the processor units under consideration, and processing of the data by the processors.

Other features which are considered as characteristic for the invention are set forth in the appended claims.

Although the invention is illustrated and described herein as embodied in a unit for distributing and processing data packets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a schematic block diagram of an exemplary embodiment according to the invention.

DESCRIPTION OF THE PREFERRED EMBODIMENTS

Referring now to the single FIGURE of the drawing in detail, there is shown an exemplary embodiment according to the invention. Incoming data packets. arrive at an initial processor unit 1, which reads administration information that is stored in the headers of the data packets. The administration information in the data packets is passed on from the initial processor unit 1 to an allocation unit 2. The data packets are distributed on the basis of their administration information to input memories Port i (i=1, . . . N) of associated, parallel-connected processor units Pi (i=1, . . . , N). The input memories Port i have the addresses of the processor units Pi. The data packets that are assigned to a processor unit Pi can be stored in the input memory Port i until the processor unit Pi is available to process them. However, no more data packets may be supplied to an input memory Port i if this would result in the input memory Port i overflowing. In order to process the data, the processor units Pi each have one processor 7 and, in addition, each have a local data memory 8. The local data memory for a processor unit Pi is used, for example, to store the administration information for a data packet while it is being processed, and to store the parts of the data packet which are not being processed. The processors draw their programs for processing the data from a jointly used program memory 4.

The processor units Pi produce operating information which provides information not only about the load level on the corresponding processor but also about the filling level of the associated input memory Port i, as well as about the data which is located in the relevant processor unit Pi. The operating information is passed to the allocation unit 2 via the input memory Port i. The allocation unit 2 uses the operating information as well as the administration information for the data packets as a further criterion for distributing the data packets to the processor units Pi. This measure has the advantage that fully loaded processor units Pi are not supplied with any further data packets for processing.

All the processor units Pi have a link to a common data bus 5. The processor units Pi have access to a jointly used memory area 6 via the data bus 5. Furthermore, the processors of adjacent processor units Pi have intermediate connections 7 for interchanging data. Entire data packets can be passed via the intermediate connections 7 to the processors of adjacent processor units Pi for processing, or else only parts of data packets as well, for example, as the operating information for the processor units Pi. When overloading occurs, it is possible to provide for a processor unit Pi to transfer data packets which have already been received or which may already be being processed, or parts of them, directly to an adjacent processor unit Pi for processing. In this case, it is also possible to provide for data to be transferred in this way without taking any account of the operating information. In the event of a data transfer, the allocation unit 2 is informed of this, in order that it can include the new operating states of the processor units Pi in its decisions.

Since, once a data transfer has taken place between two adjacent processor units Pi, one data packet may in some circumstances be located in both processor units Pi, it is necessary to control the output times of the data from the processor units Pi to the data bus 5. This is the only way in which the processed data associated with the original data packet can be joined together again in the correct sequence. The task of controlling the output times is transferred to a synchronization unit 3. The allocation unit 2 provides the synchronization unit 3 with information about the operating states of the processor units Pi and about the data packets that are in the process of being processed. In order to control the output times for the data from the processor units Pi, the synchronization unit 3 transmits commands in the form of synchronization data cells to the input memory Port i associated with the processor units Pi. In order to ensure that the data is output in the correct sequence, the synchronization data cells are always processed by the input memories Port i and by the processor units Pi with priority over other data.

It is also possible to provide for the synchronization unit 3 to control the output sequence of data packets that are part of a data stream. A data stream is formed from data packets that originate from one specific transmitter and are intended for one specific recipient. In the case of a data stream such as this flowing between one transmitter and one recipient, it is important that the sequence of data packets is not changed, or is changed only insignificantly, by the unit according to the invention. For this reason, the data packets in a data stream are distributed by the allocation unit 2 to only one processor unit Pi, or to only a small number of processor units Pi, for processing. The synchronization unit 3 then controls the output of the data packets to the data bus 5, so that the original sequence of the data packets is maintained.

Although it may be worthwhile for some applications to combine the processed data from a data packet once again in a data packet after it has been output from the processor units Pi, it is also feasible for the data packets to be formed on the basis of other criteria after or during the processing. It is thus possible, for example, to interchange the headers of data packets, to split data packets, to combine two or more data packets to form one data packet, or to produce new data packets, even while processing is taking place.

I claim:

1. A unit for distributing and processing data packets, comprising:
    a data bus;
    parallel-connected processor units for processing the data packets, said processor units having processors with each of said processor units having one processor and a connection to said data bus being a jointly used data bus, said processors of adjacent ones of said processor units having additional intermediate connections for interchanging data between said processor units; and
    at least one administration unit coupled to said processor units and distributing the data packets to said processor units in dependence on at least one of administration information stored in the data packets and on operating information of said processor units, said processor units transmitting the operating information;
    said administration unit informed about a data transfer occurring between adjacent ones of said processor units via said intermediate connections.

2. The unit according to claim 1, wherein each of said processor units has an upstream input memory resulting in a plurality of upstream input memories.

3. The unit according to claim 1, wherein the operating information of said processor units contains information about a load level on associated ones of said processors.

4. The unit according to claim 1, wherein the operating information of said processor units contains information about data packets which is located in a processor unit under consideration.

5. The unit according to claim 2, wherein the operating information of said processor units contains information about a filling level of said upstream input memory.

6. The unit according to claim 2, wherein said administration unit includes:
    an initial processor unit for reading the administration information stored in the data packets;
    an allocation unit for distributing the data packets to said processor units in dependence on at least one of the administration information and of the operating information; and
    a synchronization unit for controlling output times of data from said processor units on a basis of the administration information and operating information transmitted from said allocation unit.

7. The unit according to claim 6, wherein commands which are transmitted from said synchronization unit for controlling the output times of the data are transmitted in a form of synchronization data cells to said upstream input memories of said processor units.

8. The unit according to claim 7, wherein said upstream input memories and said processor units are configured to process the synchronization data cells with priority over other data.

9. The unit according to claim 1, wherein said administration unit is configured to allocate to a specific one of said processor units the data packets which can be considered to be associated with each other on a basis of the administration information and which are data packets which are associated with a same data stream.

10. The unit according to claim 1, wherein said processor units each have a local data memory.

11. The unit according to claim 1, further comprising a program memory connected to and accessed by said processor units, said program memory is accessed jointly by all of said processor units.

12. The unit according to claim 1, further comprising a memory area connected to said data bus and jointly used by said processors, said processors having access through said data bus to said memory area.

13. The unit according to claim 1, wherein adjacent ones of said processor units are configured for interchanging the operating information via said additional intermediate connections.

14. The unit according to claim 1, wherein user data is interchanged between said processor units in dependence on the operating information.

15. The unit according to claim 1, wherein the operating information of said processor units contains information about the data packets located in a processor unit under consideration.

16. The unit according to claim 1, wherein said administration unit is configured to allocate to a specific group of said processor units the data packets which can be considered to be associated with each other on a basis of the administration information and which are data packets which are associated with a same data stream.

17. A method for distributing data packets to parallel-connected processor units each having a processor, and for processing the data packets by the processors, which comprises the steps of:
    reading administration information stored in the data packets;
    distributing the data packets to the processor units in dependence on at least one of the administration information of the data packets and on operating information of the processor units;
    interchanging data between processors of adjacent processor units in dependence on the operating information for the processor units under consideration; after performing the step of interchanging the data between the processors of the adjacent processor units, distributing further data packets to the processor units in dependence on the data that has been interchanged; and
    processing the data packets by the processors.

18. The method according to claim 17, which further comprises:
   storing the data packets supplied to the processor units in an input memory; and
   processing the data packets through a processor.

19. The method according to claim 17, which further comprises transmitting information about a load level of an associated processor in the operating information for a specific processor unit.

20. The method according to claim 17, which further comprises transmitting information about the data packets located in a processor unit under consideration using the operating information of the processor unit.

21. The method according to claim 17, which further comprises transmitting information about a filling level of an upstream input memory using the operating information of a processor unit.

22. The method according to claim 17, which further comprises providing a synchronization unit for controlling output times of the data packets from the processor units in dependence on the administration information and the operating information.

23. The method according to claim 22, which further comprises transmitting commands which are transmitted from the synchronization unit for controlling the output times of the data packets in a form of synchronization data cells to input memories of the processor units.

24. The method according to claim 23, which further comprises processing the synchronization data cells in the input memories and in the processor units with priority over other data.

25. The method according to claim 17, which further comprises allocating the data packets which are considered to be associated data packets on a basis of the administration information and are associated with a same data stream to a specific one of the processor units.

26. The method according to claim 17, which further comprises storing parts of a data packet, during processing of the data packet under consideration, by an associated processor in a local data memory of the associated processor unit.

27. The method according to claim 17, which further comprises reading in programs for data processing from at least one program memory used jointly by all the processors.

28. The method according to claim 17, which further comprises accessing a memory area jointly used by all of the processor units.

29. The method according to claim 17, which further comprises interchanging the operating information between adjacent processor units.

30. The method according to claim 17, which further comprises maintaining a sequence of the data packets in an incoming data stream for an outputting of the data packets from the processor units.

31. The method according to claim 17, which further comprises transmitting information about the data packets located in a processor unit under consideration using the operating information of the processor unit.

32. The method according to claim 17, which further comprises allocating the data packets which are considered to be associated data packets on a basis of the administration information and are associated with a same data stream to a specific group of the processor units.

* * * * *